Sheet 1, 2 Sheets.
A. Van Order.
Ship Building.
No. 2,873. Reissued Feb. 18, 1868.
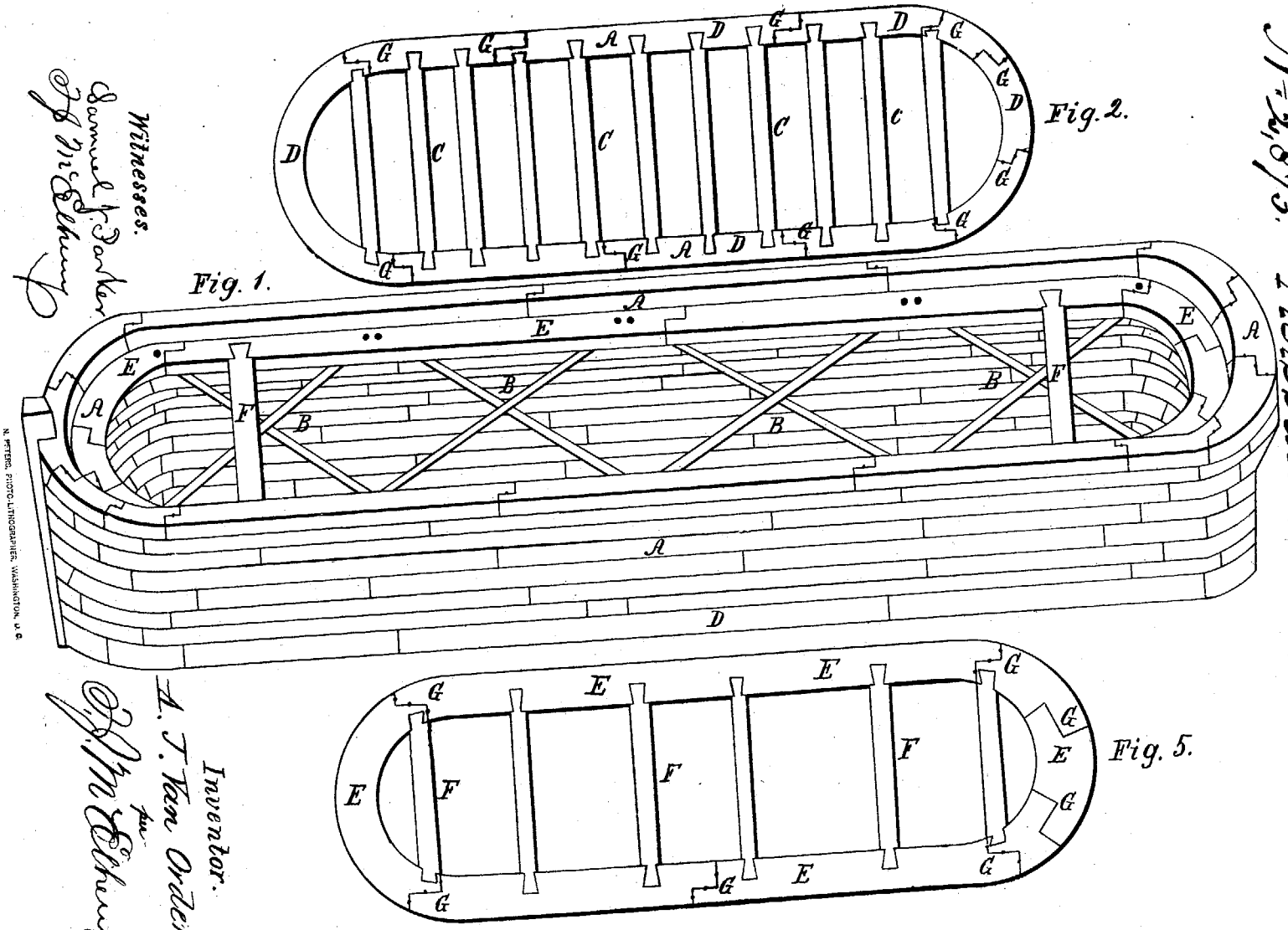
Witnesses.
Samuel J. Parker
J. J. McElhenny
Inventor.
A. J. Van Order
per
J. J. McElhenny
N. PETERS, PHOTO-LITHOGRAPHER, WASHINGTON, D. C.

A. Van Order. Sheet 2, 2 Sheets
Ship Building.
Reissued Feb. 18, 1868.
No. 2,873
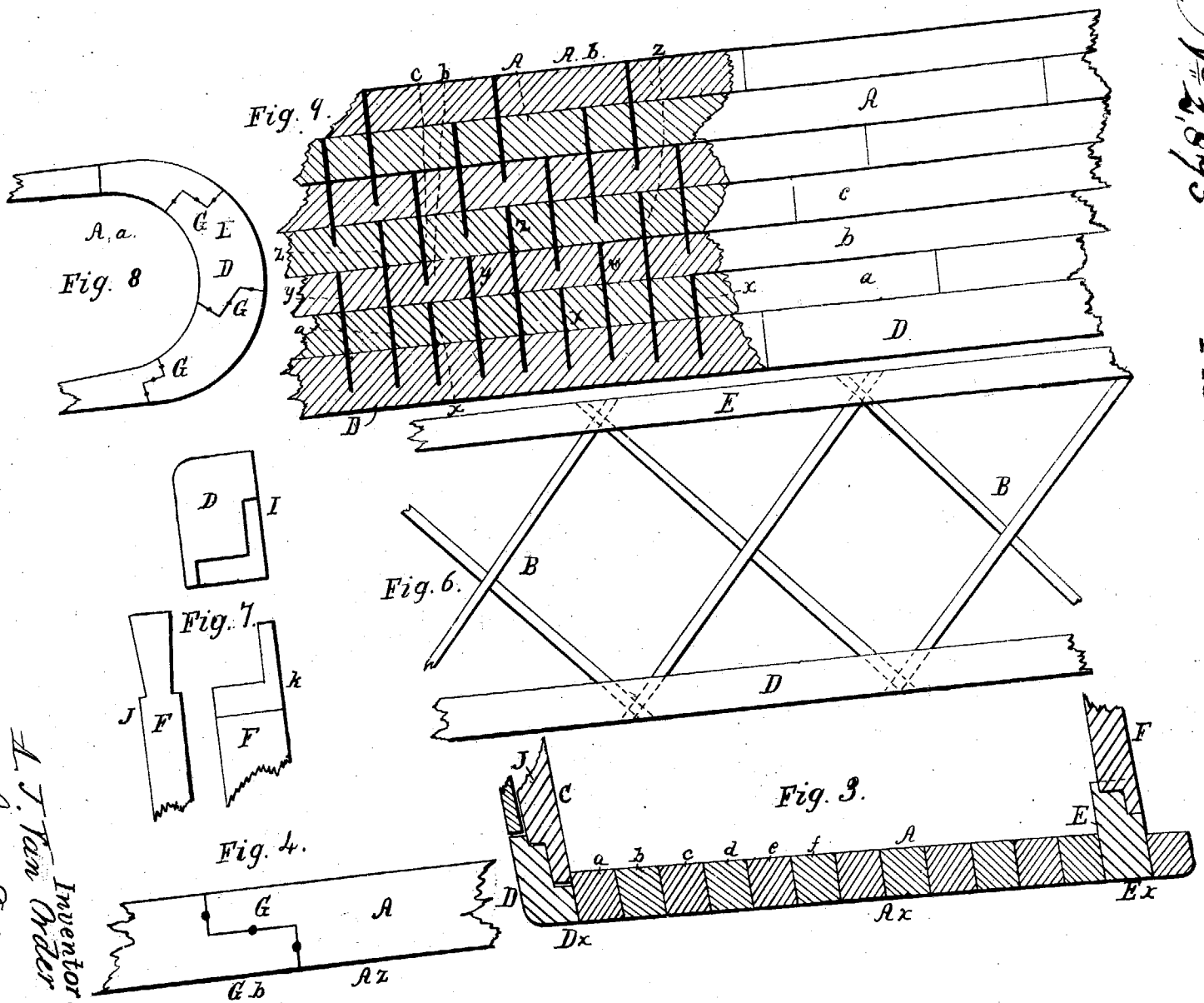
Witnesses.
Samuel J. Parker
J. J. McElhenny
Inventor.
A. J. Van Order
per J. J. McElhenny
N. PETERS, PHOTO-LITHOGRAPHER, WASHINGTON, D. C.

UNITED STATES PATENT OFFICE.

ABRAM VAN ORDER, OF ITHACA, NEW YORK.

IMPROVEMENT IN THE CONSTRUCTION OF BOATS.

Specification forming part of Letters Patent No. 33,272, dated September 10, 1861; Reissue No. 2,873, dated February 18, 1868.

*To all whom it may concern:*

Be it known that I, ABRAM VAN ORDER, of Ithaca, Tompkins county, New York, have invented certain Improvements in Building Canal-Boats; and I do hereby declare that the following is a full and exact description thereof, reference being had to the accompanying drawings, and to the letters marked thereon.

My object is to make a stronger, more durable canal-boat than is made by the usual mode. This I accomplish by the use of several devices, which are—

First. A novel and very strong way of making the bottom of the boat. In the ordinary mode there are no bilge-timbers that go about the circumference of the boat to receive the wear and tear of the banks, but the planking of the boat, with its calked seams exposed to damage and leakage, alone sustains the force with which the boat strikes the bank at the bilge, which is often very severe. To remedy this I make a bilge-frame about the whole bottom of the boat of heavy timber, on which I usually place no planking, so that my bilge-timbers and frame receive the force when the boat strikes the canal-bank; and within the bilge-frame I protect the bottom planking.

Second. The ordinary floor-timbers are spiked to the uprights or studs of the boat. I make mine stronger and better by a double dovetailing into the bilge-timbers just described.

Third. In building an ordinary canal-boat the skeleton of floor-timbers and studs is first set up, and then the planking is nailed or spiked to these. In my boat I commence on the bottom frame of my bilge-timbers, made as described, and build upward by successive layers placed on the bilge-timber frame.

Fourth. In the ordinary boat no solid timber or timbering makes the shell of the boat. In mine it makes at least a part, and I prefer the whole, of the sides and ends.

Fifth. In the ordinary boat there is no spiking of the planking or other parts of the shell of the boat from above downward. In making mine I use a peculiar method of spiking my solid timbers, so that I virtually make the sides and, when I choose, the whole shell (sides and ends) as if one timber by my spikes.

Sixth. In the ordinary boat no iron bracing is used. I use iron rods to brace and make rigid my boat, and to connect the bilge and gunwale timbers into one frame.

Seventh. In the ordinary boat there are no stops used in the butts of the boat. I use them in mine.

Eighth. In the ordinary boat there can be no effective calking of the boat's inner planks, and if there is a stout inside planking then the giving of the planks or spikes easily displaces it; but my inside calking is between solid timbering, and is subject to no such uncertainties.

Ninth. In my mode of spiking there are no ends of the spikes exposed to the weather, but they are concealed in the sides and ends within the calked spaces, which is not the case in ordinary canal-boats.

These devices are seen in the drawings, which are: Figure 1, a view of my boat; Fig. 2, a view of the timbering of the bottom of my boat; Fig. 7, in part, views of the dovetailing of the bottom of my boat; Figs. 3 A *x*, a view of the construction of the side or shell of my boat in transverse section; Figs. 9 A *b*, a view of the spiking of the layers of the sides and ends of my boat. Figs. 8 A *a* is a view of the layers of the ends of my boat and of the stops in the butt-splicing of the layers. Figs. 4 A *z* is a view of the layers of the sides and of the stops in the butts of the same; Fig. 5, a view of the frame of the gunwale of my boat; and, lastly, Figs. 6 B is a view of the iron rod of my gunwale and bilge frames.

In Fig. 1 the letter A shows the sides and ends of my boat laid up solid from the bilge-frame, smooth on the outside, and, if I please, on the inside also, thus making the shell or hull of my boat with no defacing of either the outside or of the inside by the spike-heads, or of the hammer or sledge in their driving; and D shows the bilge-timbers as solid, and a part of the bottom, sides, and ends, where the boat is most liable to wear, as it there strikes and grates most violently the banks of the canal; and E is the gunwale, and B the iron rods that hold the bilge and gunwale timbers into one frame, and thus brace the boat; and F F, the deck-timbers dovetailed into the gunwale-timbers.

In Fig. 2 is seen the bottom of my boat, made by the pieces D D, (any convenient number,) in part or wholly extended about or around the outside of the boat; and C C (any convenient number) are the floor-timbers, by the dovetailing secured to the bilge-timbers D D.

In Fig. 7 are views of how this dovetailing is done, which I make either by a beveled or a notched tongue extending under the side layers. At I is the section of a bilge-timber with a notched mortise or gain cut in it. At K is the end of a floor-timber, with a notched tongue fitting the mortise in the bilge-timber. At J is the top view of the same floor-timber. Thus the bilge-timbers are held fast to the floor-timbers and make a very stout frame, capable of resisting pressure upward or downward, and the strain produced when, for any cause, the water is out of the canal. In Fig. 3 A *x* is a transverse section of the sides of my boat, showing how I lay up my boat from the bottom with solid timbers. In it D is the section of the bilge-frame, made and completed usually before any other part of the boat is put together or upon it, and J is one of the floor-timbers dovetailed into D, with the bottom planking under it. Then, on D, I lay the lower solid timber, *a*, and spike it to the timber D; and on *a*, I lay and spike *b*, and on that *c d* and other timbers, until the place for the gunwale is reached, when E is in like manner laid and spiked, and the deck-timbers F driven and secured in their dovetailed mortises.

In Fig. 9 A *b* is seen how I spike or bolt the timbers *a b c*, &c., together. At the right hand the finished out or in side of the boat is seen to be smooth and not defaced or injured by the spikes or their driving; and at the left hand the side of the boat is represented as cut away to the middle of the boat side, so that the spikes or bolts are seen as they are driven at certain intervals and in such a manner as to bind two or more pieces or parts together. The spiking repeats itself over, beginning over the bolts *x x*, &c., as is apparent in the figure.

In Fig. 8 A *a* the mode of making the ends of my boat is seen, with the lap of the butts of the timbers and the stops G in the butts.

In Fig. 4 A *z* the butts of the sides and the stops G in them are seen.

In Fig. 5 the construction of the gunwale and deck timber frame is seen to be similar to that of the floor and bilge.

In Fig. 6 B my iron bracing is seen, and D is the bilge-timber, and E the gunwale-timber, and the rods are seen holding in a bracing position these two timbers together.

The further construction and uses of my several devices and of my boat are apparent to those skilled in the art to which it appertains.

I claim—

1. The construction of the described layers of wood placed one above the other, making the shell or sides and ends of the boat, the described method of spiking or bolting the said layers together, and the cross-rod bracing connecting the bilge-timbers with the gunwale-timbers, when arranged in relation to each other, substantially as and for the purposes described.

2. Constructing the sides and ends of boats wholly of horizontal layers of timbers bolted or spiked one upon the other, substantially in the manner and for the purposes set forth.

3. The construction of a bilge or bottom frame of solid timber, in whole or in part, about the bottom of a boat, when the floor-timbers are attached thereunto, as described, and for the purposes specified.

4. The arrangement and construction of the bottom planking on the floor-timbers within and protected by the bilge-frame, as set forth.

5. The floor-timbers dovetailed to the bilge-timbers on their inner side and top, and held in place by the horizontal layers on their ends, for strength and security against accident, as set forth.

6. Constructing the sides and ends of boats of layers of horizontal timbers bolted or spiked one upon the other and upon the bilge-frame and upward from it, substantially as and for the purposes described.

A. VAN ORDER.

Witnesses:
SAMUEL J. PARKER,
T. J. MCELHENY.